US006685552B2

(12) United States Patent
Nomura

(10) Patent No.: US 6,685,552 B2
(45) Date of Patent: Feb. 3, 2004

(54) DISK FOR COIN HOPPER

(75) Inventor: Tomokazu Nomura, Iwatsuki (JP)

(73) Assignee: Asahi Seiko Kabushiki Kaisha, Tokyo (JP)

( * ) Notice: Subject to any disclaimer, the term of this patent is extended or adjusted under 35 U.S.C. 154(b) by 248 days.

(21) Appl. No.: 10/014,614

(22) Filed: Nov. 7, 2001

(65) Prior Publication Data

US 2002/0061724 A1 May 23, 2002

(30) Foreign Application Priority Data

Nov. 7, 2000 (JP) ....................................... 2000-340420

(51) Int. Cl.[7] ........................... G07D 1/00; G07F 11/24; B65G 59/00; B65H 3/00

(52) U.S. Cl. ............................ 453/33; 453/57; 221/227

(58) Field of Search .............................. 453/33, 12, 49, 453/57; 221/277

(56) References Cited

U.S. PATENT DOCUMENTS

| | | | | |
|---|---|---|---|---|
| 6,039,166 A | * | 3/2000 | Abe et al. | 194/317 |
| 6,193,599 B1 | * | 2/2001 | Kurosawa et al. | 453/57 |
| 6,210,264 B1 | * | 4/2001 | Richardson | 453/57 |
| 6,609,966 B1 | * | 8/2003 | Kurosawa et al. | 453/57 |

FOREIGN PATENT DOCUMENTS

| | | |
|---|---|---|
| EP | 0 959 437 A2 | 11/1999 |
| JP | 52-93592 | 7/1977 |
| JP | 56/52516 | 12/1981 |
| JP | 060187533 A | 7/1994 |
| JP | 09-180019 A | 7/1997 |
| JP | 0959437 A2 | 11/1999 |

* cited by examiner

*Primary Examiner*—Donald P. Walsh
*Assistant Examiner*—Kenneth W Bower
(74) *Attorney, Agent, or Firm*—McGlew and Tuttle, P.C.

(57) ABSTRACT

A coin hopper is provided with a disk for dispensing petals-shaped coins smoothly. Particularly the discharging of coins for 20 Euro cents occurs with a smooth pay out using the disk in rotation, accepting a plurality of coins which are stored in a bulk condition. The disk has an opening for accepting and for releasing these coins one by one. The disk has a primary protrusion (23) which is formed on an underside of this disk (21), near the axis line of rotation and at a trailing side edge of the opening (22). A curved second protrusion (24) is formed near this primary protrusion and formed from the trailing side edge of said opening toward a further trailing position. A large curved third protrusion is formed from near trailing position of this second protrusion along the fringe area of the disk.

3 Claims, 9 Drawing Sheets

DISK FOR COIN HOPPER

FIELD OF THE INVENTION

This invention generally relates to coin hopper device for releasing a plurality of coins one by one and relates to coin hopper device which is used for vending machines, money-changers and game machines. The invention more particularly relates to a coin hopper disk for storing a plurality of coins in a bulk condition and for sending out the coins one by one, wherein the disk is suitable for petals-shaped coins, of which circumferential edges of the generally circular coins are formed to be rugged. The terminology "coin" as used in this specification relates to coins that are currency as well as small disks, medals and tokens used for gamming, etc.

BACKGROUND OF THE INVENTION

A coin hopper device is disclosed in Japanese Utility Model Application 51-964 by this applicant. This Japanese Utility Model Application 51-964 is published on Japanese Utility Model Publication 56-52516 and is registered. FIG. 7 is a summarized front view which shows a prior coin hopper which is disclosed in Japanese Utility Model Application 51-964. FIG. 8 is a summary and enlarged perspective exploded view of the subject of FIG. 7. FIG. 9 is a summary sectional view which shows the feature of coin hopper on FIG. 8, and a bottom view of a disk thereof.

This hopper disk 14 is rotated in the counterclockwise direction by an electric motor 3 and gear equipment 4, etc. When disk 14 is rotated, coins within ring 6 provided at the lower part of tank 2 fall into receiving holes 18. The coins which fall into receiving holes 18 are slid on base board 7 and directed toward exit 10. That is to say, the coin on base board 7 is pushed toward exit 10 by means of protrusions 29 and 30 and 31. The coin which is pushed by protrusions 29 and 30 and 31 is released from exit 10 by pins 26 and 27 and 28. The coin discharged from exit 10 pushes a roller 39 of switch arm 38 and falls into shoot 34. Base board 7 is tilted and fixed by leg frame 35. Also, the upper openings of receiving holes 18 are formed in taper planes 19. Pins 26 and 27 and 28 are disposed on a spring plate (not shown).

Pins 26 and 27 and 28 project freely from small holes 21 and 22 and 23 of base board 7, respectively. Also, near the outside at outside pin 28, a triangular piece 11 for coin guidance is arranged. This coin guide piece 11 is freely rotatably arranged on base board 7, by shaft 12. This coin guide piece 11 is positioned by means of a spring plate (not shown). On the underside center of disk 14, a boss 15 is provided for protecting the rotating shaft. This boss 15 is freely rotatably inserted into base board 7 (see FIG. 9). At the underside of disk 14 around boss 15, a thick wall part 20 is formed. At the outside of this thick wall part 20, a thin division 20A is formed. On the underside of this thin division 20A, a large number of protrusions 29 and 30 and 31 are provided for issuing coins. However, such conventional coin hopper devices were provided based on the premise that coins to be handled would be purely circular.

SUMMARY AND OBJECTS OF THE INVENTION

This invention relates to a coin hopper device for issuing a plurality of coins one by one. This invention relates to a coin hopper device which is used for vending machines, moneychangers and game machines. This invention concerns a coin hopper disk receiving coins stored as a plurality of coins in a bulk condition and for issuing the coins one by one. More particularly, this invention relates to a hopper disk which is suitable for coins including petals-shaped coins (i.e., coins with petal-shaped portions or lobes about the periphery of the coin) of which the circumferential edges of the otherwise circular coins are formed rugged. As indicated above, the term "coin" used meaning coin currency as well as small disk medals, tokens and the like.

The invention also relates to a coin hopper device for issuing a plurality of coins one by one. This invention relates to a coin hopper device which is used for vending machines, moneychangers and game machines. This invention concerns a coin hopper disk receiving coins stored as a plurality of coins in a bulk condition and for issuing the coins one by one. More particularly, this invention relates to a hopper disk which is suitable for coins of different sizes and/or shapes or different outer peripheral edge shapes.

The problem in case of handling petals-shaped coins in which the circumferential edges of the circular coins are formed rugged is solved by the invention. Particularly, in the case of the petals-shaped coin, there was a problem that the dispensing thereof was not smoothly carried out in the conventional coin hopper. There was a problem that the discharging for coins of 20 such as Euro cents is not smoothly carried out. This invention was developed in order to solve the above-mentioned problems.

Especially, the invention was developed for the purpose of dispensing such petals-shaped coins smoothly. The invention is particularly useful for the discharging of coins 20 such as the Euro cents coin, such that these may be paid out smoothly.

This invention is a disk for a coin hopper, by the rotation and accepting a plurality of coins which are stored in a bulk condition into one open hole, for releasing these coins one by one. The disk has an opening and a primary protrusion formed on an underside of this disk near the axial line of rotation and trailing, with respect to a direction of rotation, of an edge of the opening. A curved second protrusion is formed near the primary protrusion. The second protrusion is formed from a trailing side edge of the opening toward a further trailing position. A large curved third protrusion is formed from near a trailing position of the second protrusion along the fringe area of the disk.

The invention also relates to a disk with the hopper assembly with a size board for opening and closing the extent of the opening is installed on the disk.

The invention also relates to a disk for a coin hopper with a size board installed on the underside of the disk.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
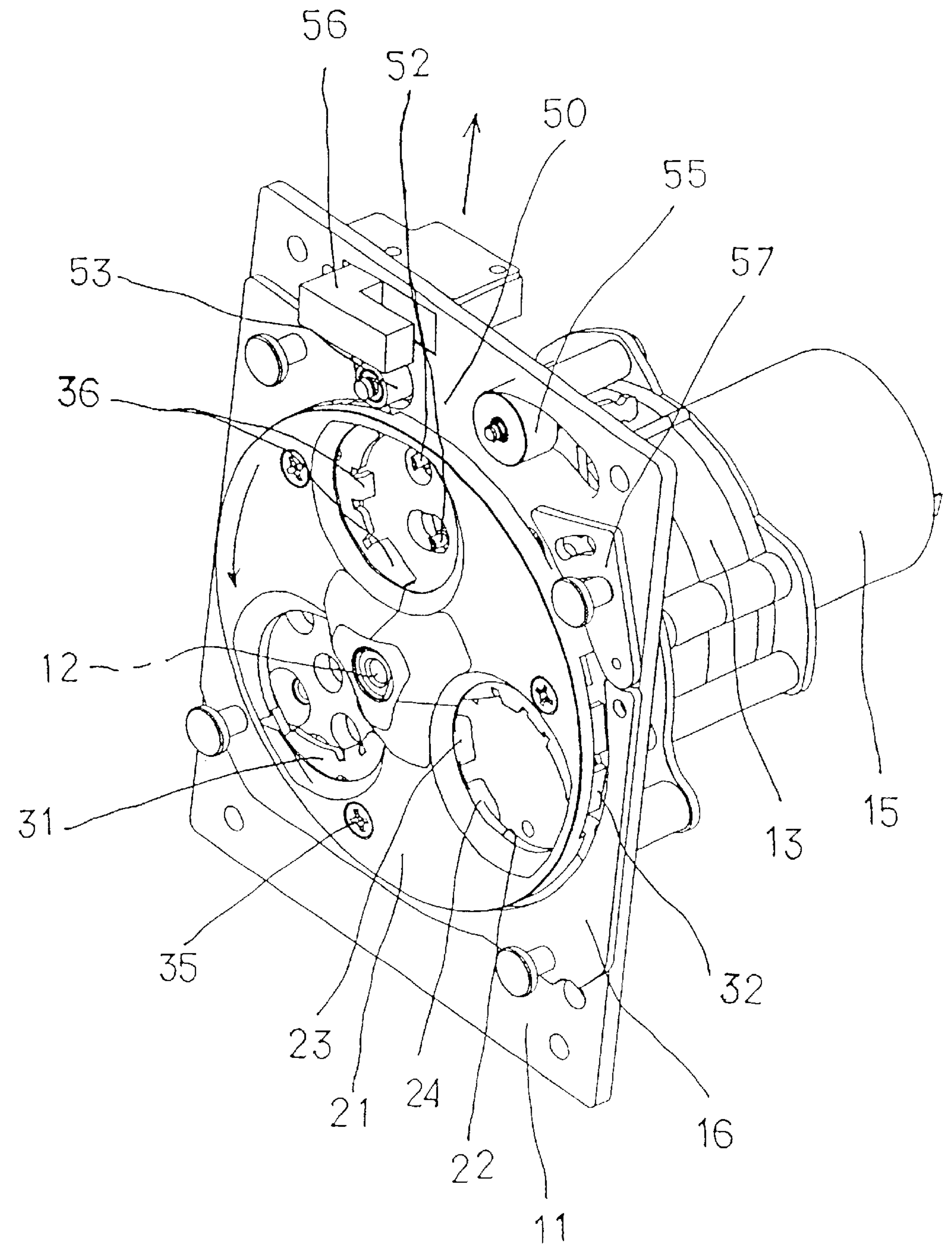
FIG. 1 is a perspective view of an embodiment according to the invention.
Figure 7:
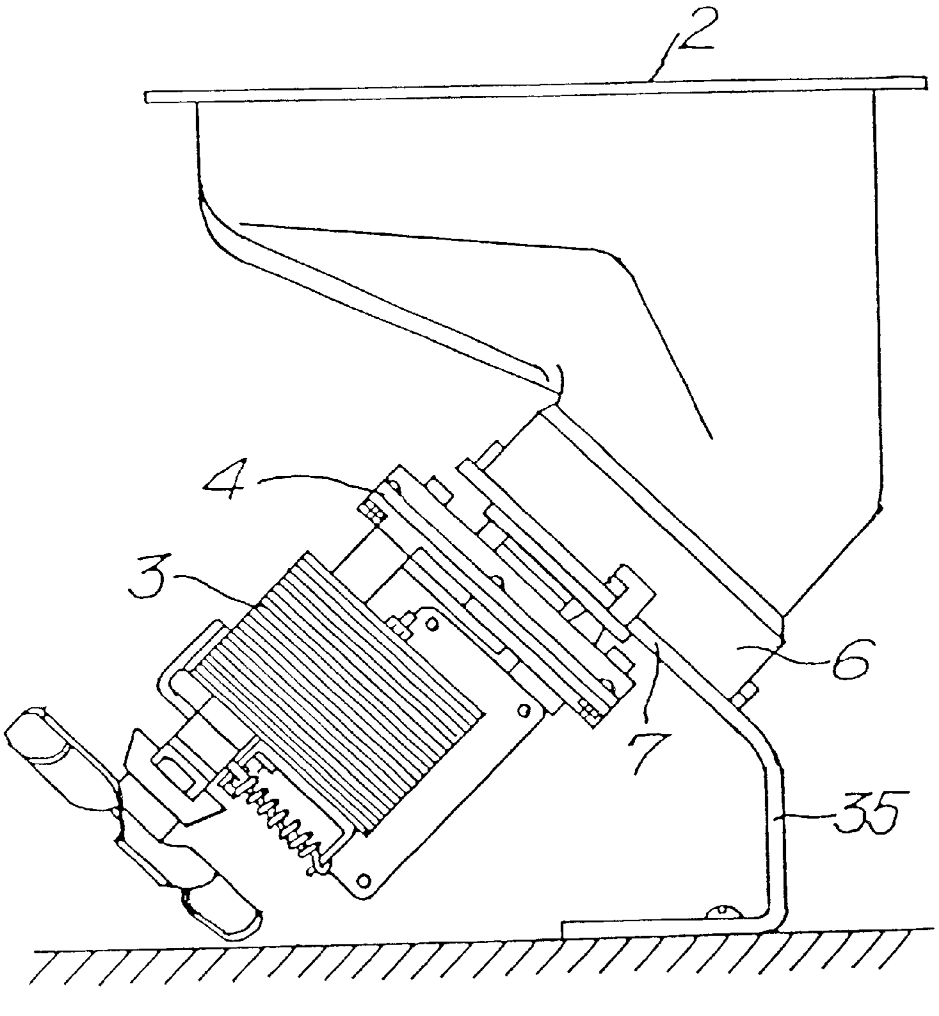
FIG. 7 is a summary front view which shows a known coin hopper assembly.
Figure 8:
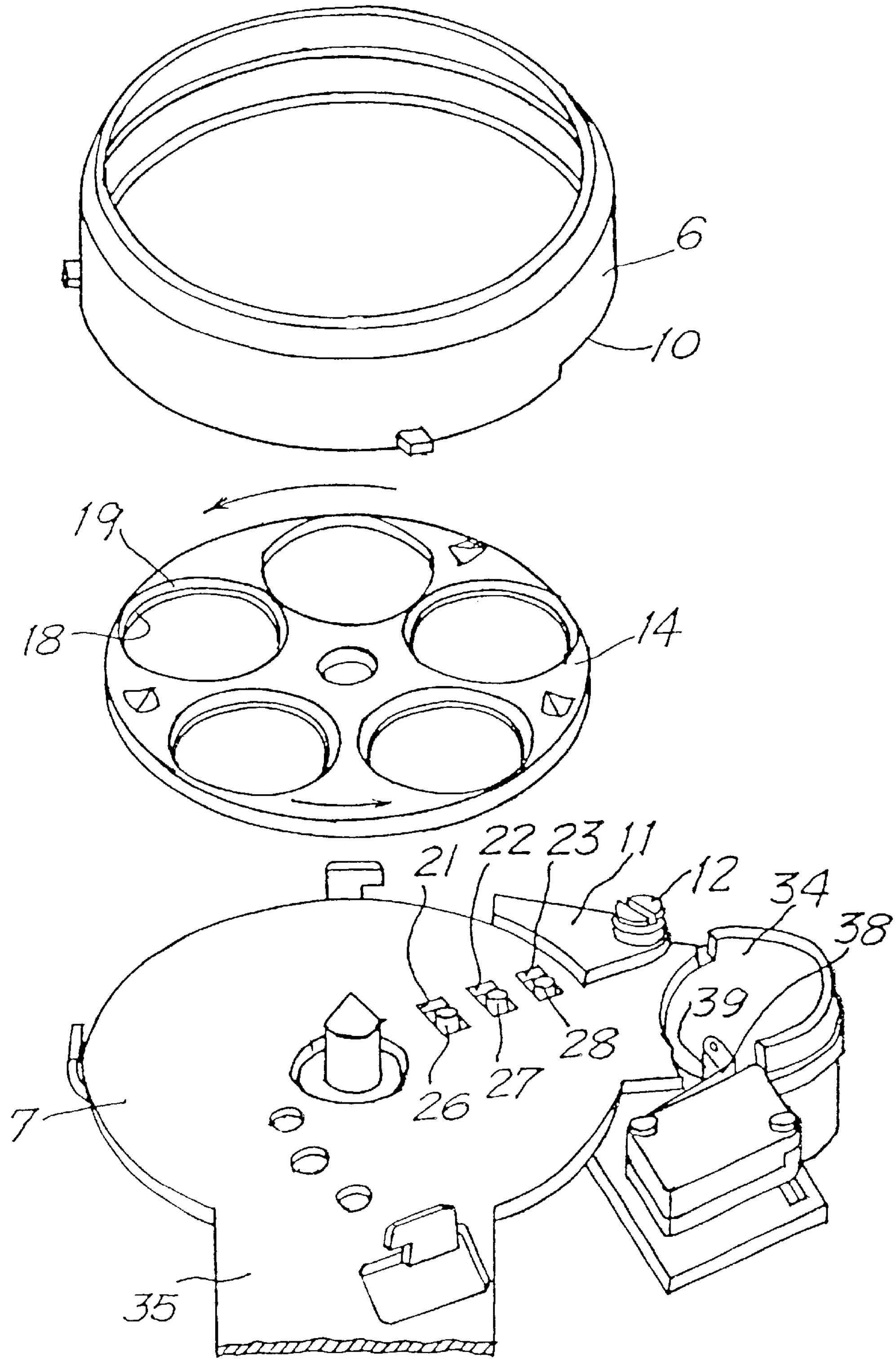
FIG. 8 is a summary enlarged perspective exploded view of an assembly according to FIG. 7.
Figure 9A:
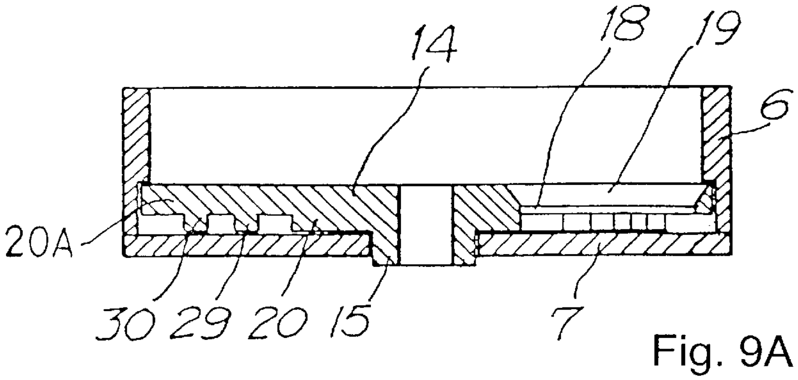
FIG. 9A is a summary sectional view showing features of the coin hopper of FIG. 8.
Figure 9B:
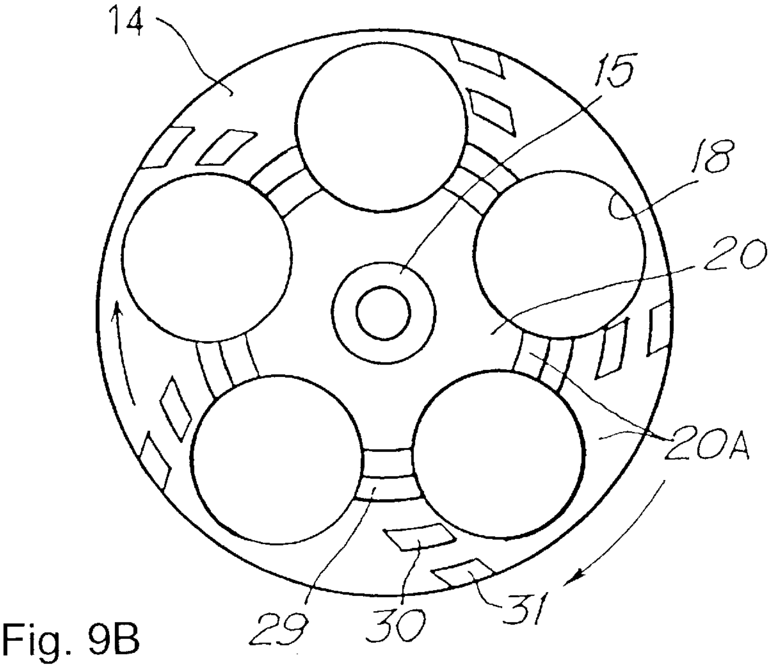
FIG. 9B is a summary a bottom view of the disk of FIG. 8.

Referring to the drawings in particular, an overall hopper device of practical example according to this invention is similar in form to the hopper device of FIG. 7 except for different features as shown in FIGS. 1 to 6. Therefore FIG. 1 shows the arrangement according to the invention with a tank (see reference numeral 2 in FIG. 7) for storing a plurality of coins removed. Also, in FIG. 1, a leg frame (see 35 on FIG. 7) which supports a rectangle base board 11 and so on are removed.

FIG. 1 shows a main section of the hopper device that is a practical example of this invention. Leg frames (not shown) which are used in the practical example of FIG. 1 are a pair of triangular metal plates. At the central part of base board 11, a little short driving shaft 12 extends inwardly (refer to FIG. 3). Deceleration gears 13 for rotating the driving shaft 12 are installed on the back surface of base board 11. Further, an electric motor 15 is arranged on the deceleration gears 13 and is provided as the rotation source for the driving shaft 12.

Figure 4A:
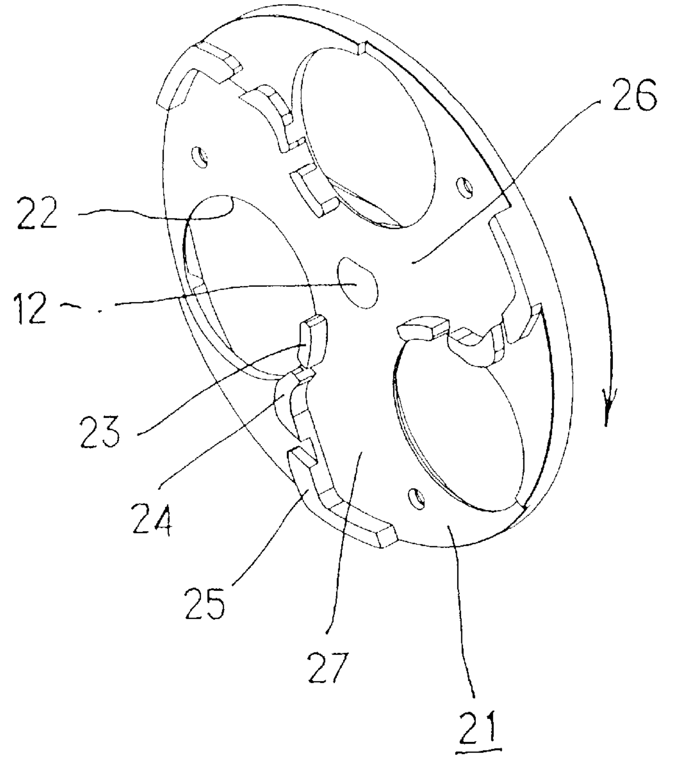
FIG. 4A is a perspective view from the back surface showing features shown in FIG. 3.
Figure 4B:
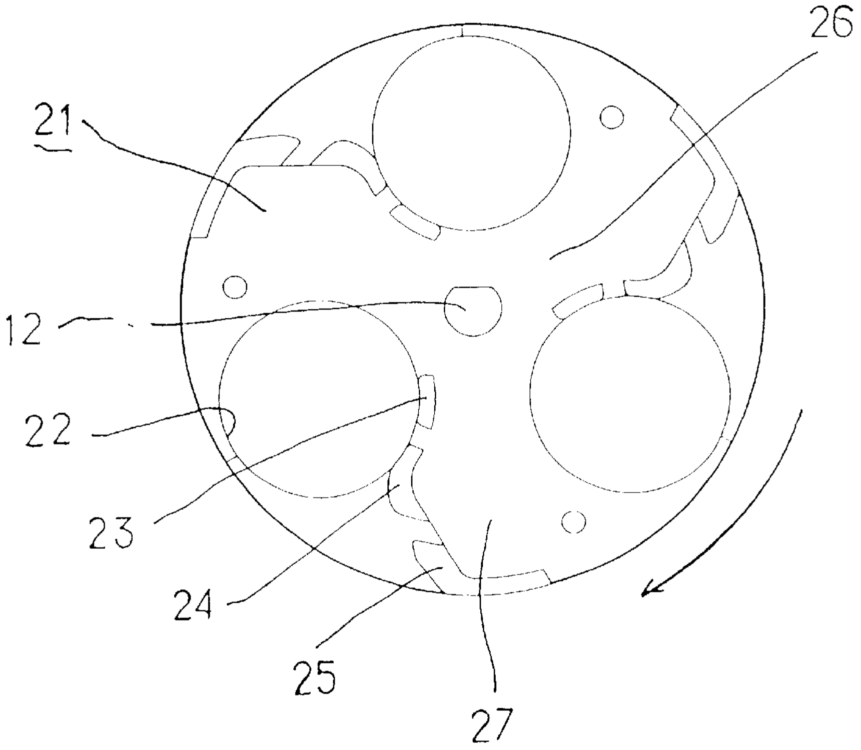
FIG. 4B is a plan view from the back surface showing features shown in FIG. 3.

A large generally C shape ring 16 is placed about almost the entire circumferential surface of base board 11. A disk 21 for emitting coins is provided within the ring 16, mounted freely rotatably (see FIG. 1). Therefore, the coins will be guided by the inner circumferential surface of ring 16. The circular disk 21 is formed out of a sintered metal. The disk 21 is fitted on the driving shaft 12. The center of the disk has a central part with a D form (FIG. 4). As a result, the disk 21 will be rotated by this driving shaft 12. The disk 21 has, in the example, three openings 22 for accepting the coins. These are spaced regularly with respect to a circumferential extent of the disk 21. On the back surface of disk 21, three sets of protrusions 23, 24 and 25 are provided for issuing the coins.

Inner short protrusion 23 is formed near the driving shaft 12 or at a part of the trailing (i.e., to the rear of the opening with respect to a direction of rotation of the opening) edge of opening 22. Center curved protrusion 24 is formed from a center part of the trailing edge of the opening 22 to the trailing direction. An outer long protrusion 25 with a generally L shape is formed from the position away from protrusion 24 to the further trailing direction. The long L-formed protrusion 25 is formed from the trailing position of protrusion 24 along the margin of disk 21. In addition, at the back surface center of disk 21, a large Y-shaped indent region 26 is formed with three ends 27(see FIG. 4B). Each end 27 is formed from the trailing of three protrusions 23 to 25 over the most outside of the further trailing opening 22. At the back surface center of disk 21, a little small Y-shaped size board 31 (FIG. 3) with three ends is fixed.

This size board 31 is for opening or closing the extent of each of the three openings 22, corresponding to the coin size. The outside edge at each end of size board 31 is bent. This forms a curvature pieces 32 at outside edges such that the coin will not bite under the size board 31. In addition, at the fringe area of each end, several screw holes 33 are provided for fitting to coin size. The size board 31 is fixed on in the indent region 26 of the back surface center region of disk 21 by means of screws 35. Screws 35 which penetrate the circumference hole of disk 21 are twisted in screw holes 33 of size board 31.

Figure 5A:
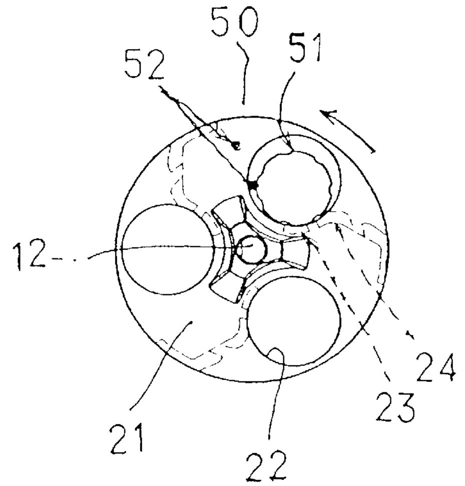
FIG. 5A is an explanation view for showing the operation of the features shown in FIG. 2.
Figure 5B:
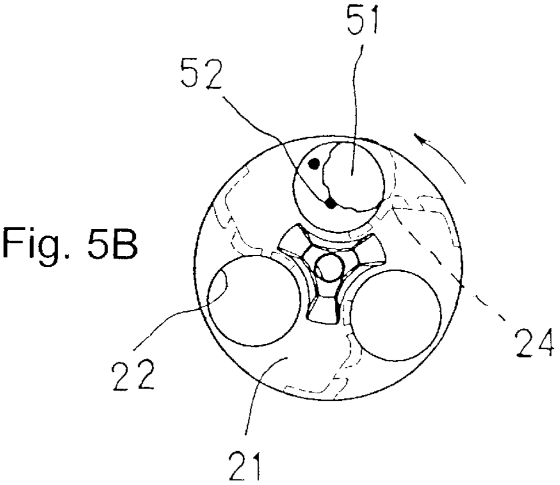
FIG. 5B is another explanation view for showing the operation of the features shown in FIG. 2.
Figure 5C:
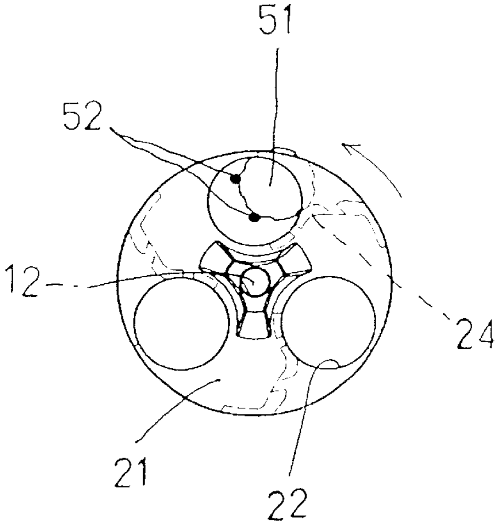
FIG. 5C is still another explanation view for showing the operation of the features shown in FIG. 2.
Figure 6A:
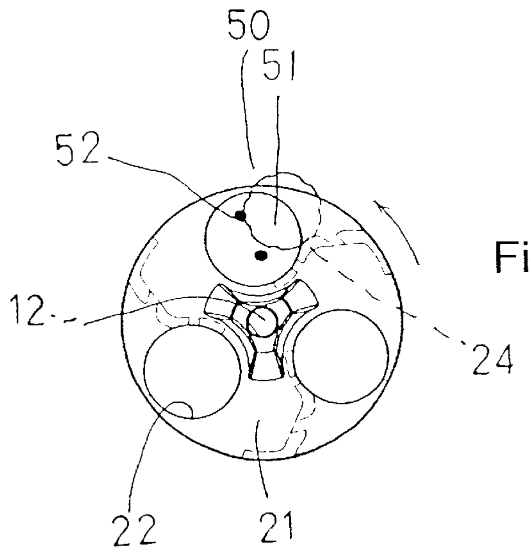
FIG. 6A is an explanation view for showing the operation of the features shown in FIG. 2.
Figure 6B:
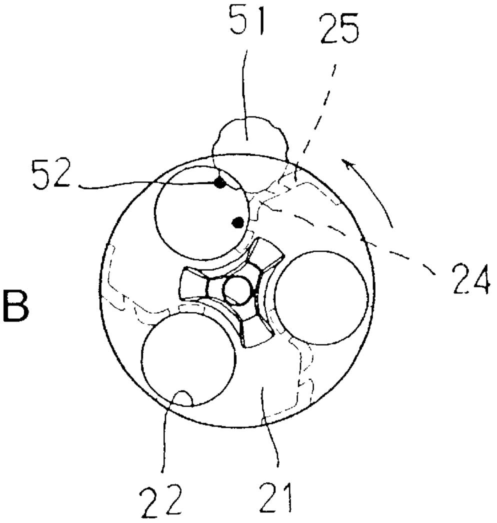
FIG. 6B is another explanation view for showing the operation of the features shown in FIG. 2.
Figure 6C:
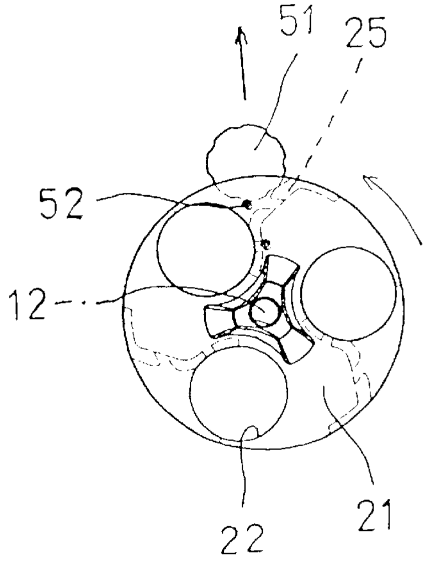
FIG. 6C is still another explanation view for showing the operation of the features shown in FIG. 2.

The trailing and curved edge of each end of size board 31 has two projecting pieces 36 formed to be bent. These projecting pieces 36 are also bent and extending to prevent the coin from inserting under the size board 31. As for the above described embodiment, the Y-shaped size board 31 is firstly fitted into large indent region 26 at the back surface of disk 21. After this, an adjustment is made to adjust for the diameter to the coin to be paid out, e.g., a petals-shaped coin 51, (FIG. 5). For this adjustment, the size board 31 is rotated a little. The appropriate screw holes 33 are selected, and the size board 31 is fixed on the disk 21 by means of screws 35 (see FIG. 3). In addition, the disk 21 on which size board 31 is fixed also is fixed on driving shaft 12.

Figure 2:
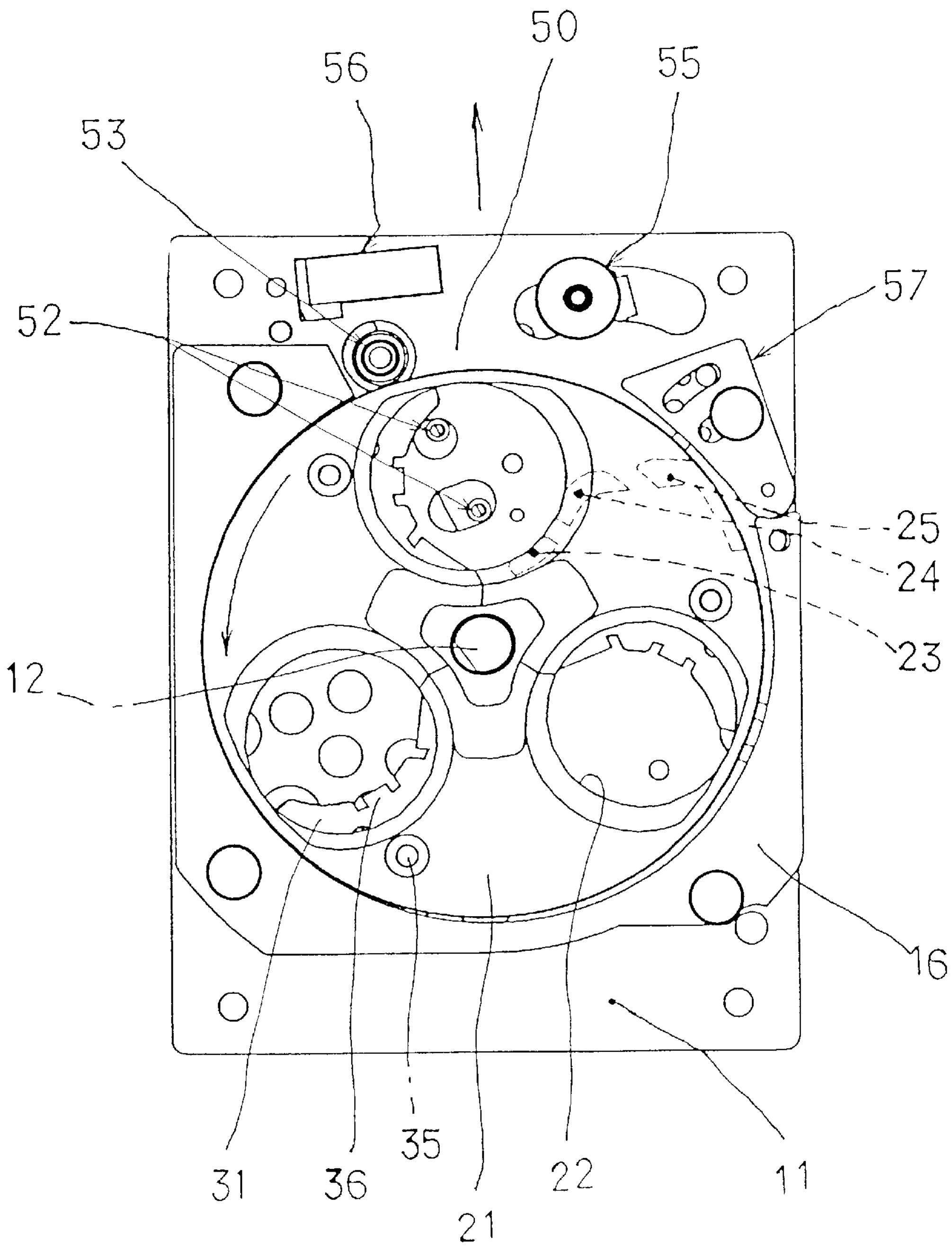
FIG. 2 is a front view of the embodiment of FIG. 1.
Figure 3:
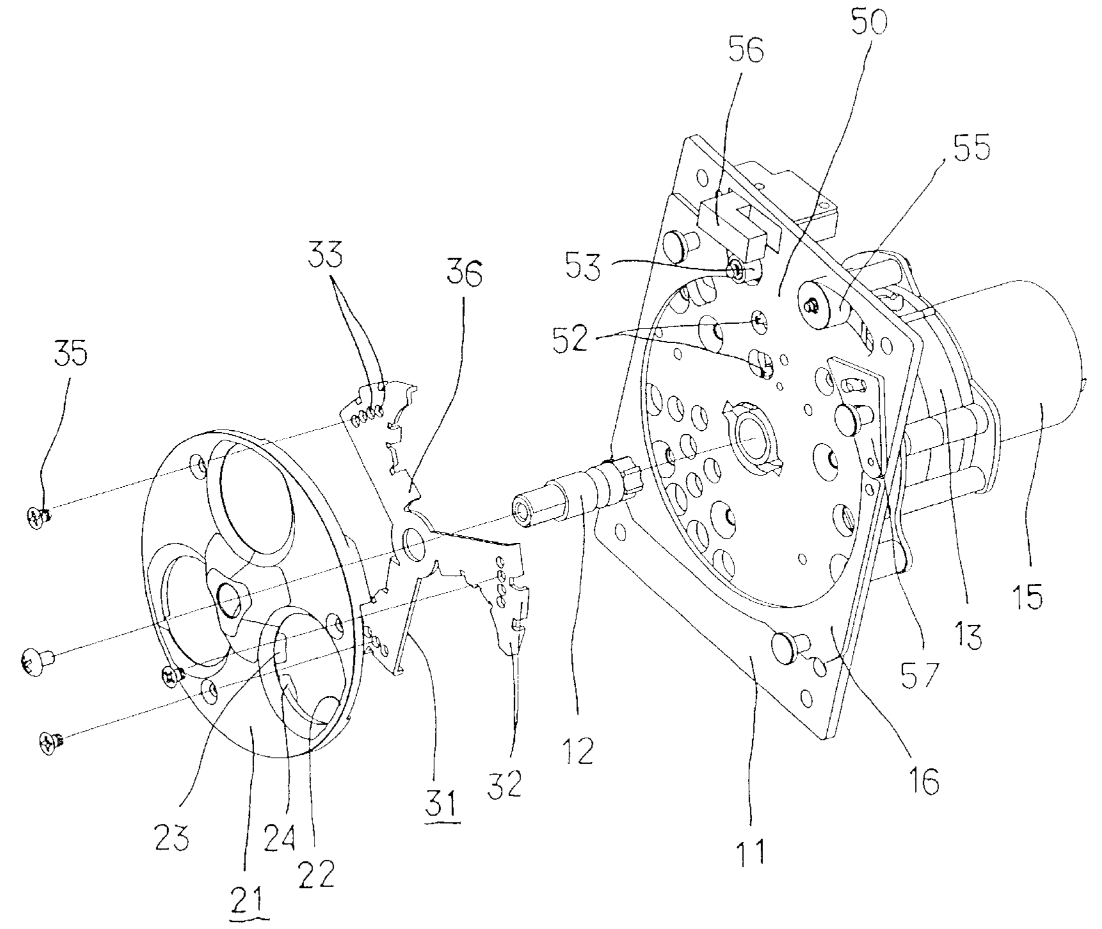
FIG. 3 is a perspective exploded view of the embodiment of FIG. 1.

Next, disk 21 is rotated in the counterclockwise by the drive of electric motor 15 (see FIG. 2). When the disk 21 is rotated, petals-shaped coins 51 within the tank (not shown) fall in openings 22 (see FIG. 5). Petals-shaped coin 51 which fall into opening 22 slide by primary protrusion 23 and second protrusion 24. In other words, primary protrusion 23 and second protrusion 24 push (e.g., radially outwardly) petals-shaped coin 51. Therefore, petals-shaped coins 51 on base board 11 are pushed toward the exit 50 which is located outwardly, in this embodiment above. Petals-shaped coins 51 which are pushed toward exit 50 by protrusions 23 and 24 hit the inside pin 52 (see FIG. 5 upper part). Further, petals-shaped coins 51 which hit the inside pin 52 are pushed toward the exit 50 by second protrusion 24 (see FIG. 5 central part). Petals-shaped coins 51 which are pushed by convexly second protrusion 24 hit outside pin 52 further (see FIG. 5 lower part). When this petals-shaped coin 51 is further pushed toward the exit 50, this coin 51 separates from the inside pin 52 (see FIG. 6 upper part). Thus, this petals-shaped coin 51 is pushed out at exit 50 by second protrusion 24 and third protrusion 25 (see FIG. 6 central part). The petals-shaped coin 51 is pushed out at exit 50 is further pushed out by third protrusion 25 (see FIG. 6 lower part). This pushed-out petals coin 51 passes through between fixation roller 53 and mobile roller 55, by resisting the spring (not shown). At this time, by the action of spring (not shown) of mobile roller 55, petals coin 51 is released outside (see FIG. 2).

Simultaneously, petals coin 51 passes through sensor 56 for coin counting such as magnetic sensors or light sensors, etc. Still, a small and triangular board near the mobile roller 55 is a guide piece 57 for guiding the coin to exit 50. The guide piece 57 is pivoted at the extension line of C-formed ring 16. Guide piece 57 is adjusted and positioned around the pivot, being based on the size of discharged coin, and is fixed by screw (not shown). The coin 51 which is pushed by protrusions 23 to 25 is guided toward the exit 50 by means of two pins 52. Therefore, the distance between two pins 52 may be decided, considering the shape of petals coin 51. The two pins 52 are supported on one or two spring plates (not shown). Two pins 52 are projected freely from small holes (symbol: not shown) of base board 11, respectively. In this practical example, size board 31 is formed in a Y-shape and fixed on the back surface of disk 21. However, though the illustration was omitted, it is of course possible to provide the size board as a circular size board, e.g., disposed on the upper surface of disk 21. For example, the size board may be formed almost of equal-shape to disk 21 and may be placed on this disk 21.

As described above, by this invention with the addition of a simple cooperating group of features, the pay-out of petals-shaped coins may be performed smoothly. The dispensing of petals-shaped coins of which the circumference edges of the generally circular coins has a ridge and valley form becomes smooth. A big effect of this development is that coins of 20 Euro cents are paid smoothly.

While specific embodiments of the invention have been shown and described in detail to illustrate the application of the principles of the invention, it will be understood that the invention may be embodied otherwise without departing from such principles.

What is claimed is:

1. A coin hopper disk:

a disk body for rotation and with at least one opening for accepting coin from a plurality of coins which are stored in a bulk condition, and for releasing coins one by one, said disk body having an underside surface with a primary protrusion adjacent an axial line of rotation and trailing, with respect to a direction of rotation of said opening, of a side edge of said opening, a curved second protrusion formed adjacent to said primary protrusion and formed from trailing of said side edge of said opening toward a further trailing position, and a larger curved third protrusion formed from adjacent to said trailing position of said second protrusion along radially outwardly area of said disk.

2. A coin hopper disk according to claim 1, further comprising a size board for opening and closing the extent of said opening, said disk being disposed adjacent to or in contact with said disk body.

3. A disk for a coin hopper according to claim 2, wherein said size board is installed on an underside of said disk.

* * * * *